US00RE46650E

(19) United States
(12) Reissued Patent
Neal et al.

(10) Patent Number: US RE46,650 E
(45) Date of Reissued Patent: Dec. 26, 2017

(54) METHOD OF MODIFYING ENGINE OIL COOLING SYSTEM

(71) Applicant: Neal Technologies, Inc., Mesa, AZ (US)

(72) Inventors: Gene Neal, Phoenix, AZ (US); Kennieth Neal, Mesa, AZ (US)

(73) Assignee: Neal Technologies, Inc., Mesa, AZ (US)

(21) Appl. No.: 15/454,656

(22) Filed: Mar. 9, 2017

Related U.S. Patent Documents

Reissue of:
(64) Patent No.: 8,635,771
Issued: Jan. 28, 2014
Appl. No.: 13/905,660
Filed: May 30, 2013

U.S. Applications:
(63) Continuation of application No. 13/746,709, filed on Jan. 22, 2013, now Pat. No. 8,505,512, which is a
(Continued)

(51) Int. Cl.
*B23P 6/00* (2006.01)
*F01M 1/10* (2006.01)
(Continued)

(52) U.S. Cl.
CPC ..... *F01M 5/002* (2013.01); *F01M 1/10* (2013.01); *F01M 5/021* (2013.01); *F01M 11/03* (2013.01); *F01P 3/20* (2013.01); *F01P 5/10* (2013.01); *F01P 11/08* (2013.01); *F01P 11/12* (2013.01); *F01M 2001/1092* (2013.01);
(Continued)

(58) Field of Classification Search
CPC ..... F01M 5/002; F01M 11/03; F01M 1/10; F01M 5/021; F01M 2001/1092; F01M 2011/033; F01P 5/10; F01P 11/12; F01P 11/08; F01P 3/20; F01P 2060/04; Y10T 29/49231; Y10T 29/49233
USPC ..... 29/888.011; 123/196 AB, 41.55, 41.56, 123/41.57, 41.58; 184/104.1, 104.2, 184/104.3, 6.5
See application file for complete search history.

(56) References Cited

U.S. PATENT DOCUMENTS 3,223,197 A 12/1965 Conover
3,561,417 A 2/1971 Downey
(Continued)

OTHER PUBLICATIONS

Web Docuents www.Sneed4Speed.com.
(Continued)

*Primary Examiner* — William Doerrler
(74) *Attorney, Agent, or Firm* — Hartman Titus PLC; John D. Titus

(57) ABSTRACT

A method of modifying the oil cooling system of a diesel engine an engine oil supply outlet located in a horizontal plan includes the steps of removing the original equipment liquid-to-liquid heat exchanger and installing a manifold having an oil outlet port directed to a remote oil cooler and a bypass water passage providing an un-branched flow of water, whereby the flow of oil is directed to a remote oil cooler and the entirety of the flow of water in the bypass water passage is discharged back to the water cooling system of the engine without passing through an oil cooling or water cooling heat exchanger.

10 Claims, 4 Drawing Sheets

Related U.S. Application Data continuation of application No. 12/804,474, filed on Jul. 22, 2010, now Pat. No. 8,375,917.

(60) Provisional application No. 61/271,719, filed on Jul. 23, 2009.

(51) Int. Cl.

| | |
|---|---|
| ***F01M 11/03*** | (2006.01) |
| ***F01P 11/12*** | (2006.01) |
| ***F01P 3/20*** | (2006.01) |
| ***F01P 5/10*** | (2006.01) |
| ***F01P 11/08*** | (2006.01) |
| ***F01M 5/02*** | (2006.01) |
| ***F01M 5/00*** | (2006.01) |

(52) U.S. Cl.

CPC .... *F01M 2011/033* (2013.01); *F01P 2060/04* (2013.01); *Y10T 29/49231* (2015.01); *Y10T 29/49233* (2015.01)

(56) References Cited

U.S. PATENT DOCUMENTS

| | | | | |
|---|---|---|---|---|
| 4,324,213 | A | 4/1982 | Kasting | |
| 4,328,480 | A | 5/1982 | Keitel et al. | |
| 4,329,854 | A | 5/1982 | Schmidt | |
| 4,364,339 | A | 12/1982 | Fricker | |
| 4,376,370 | A | 3/1983 | Kinugasa | |
| 4,406,784 | A | 9/1983 | Cochran | |
| 4,411,225 | A | 10/1983 | Dell'Orto | |
| 4,423,708 | A | 1/1984 | Sweetland | |
| 4,427,778 | A | 1/1984 | Zabriskie | |
| 4,428,338 | A | 1/1984 | Skatsche | |
| 4,432,204 | A | 2/1984 | Walsh | |
| 4,434,626 | A | 3/1984 | Schmidt | |
| 4,441,465 | A | 4/1984 | Nakamura | |
| 4,444,049 | A | 4/1984 | Hitchcock | |
| 4,471,744 | A | 9/1984 | Holtz | |
| 4,480,470 | A | 11/1984 | Tussing | |
| 4,520,660 | A | 6/1985 | Hitchcock | |
| 4,522,169 | A | 6/1985 | Arai et al. | |
| 4,610,222 | A | 9/1986 | Goddard | |
| 4,829,850 | A | 5/1989 | Soloy | |
| 4,831,980 | A | 5/1989 | Nasu | |
| 4,867,007 | A | 9/1989 | Krotky | |
| 4,867,911 | A | 9/1989 | Shortt | |
| 4,880,090 | A | 11/1989 | Ando | |
| 4,885,911 | A | 12/1989 | Wollenweber | |
| 4,891,073 | A | 1/1990 | Shortt | |
| 4,918,923 | A | 4/1990 | Wollenweber | |
| 4,923,052 | A | 5/1990 | Englebert | |
| 4,926,800 | A | 5/1990 | Valev | |
| 4,940,400 | A | 7/1990 | Speiser | |
| 4,964,459 | A | 10/1990 | Stenlund | |
| 4,996,956 | A | 3/1991 | Hupfer | |
| 5,014,775 | A | 5/1991 | Watanabe | |
| 5,029,636 | A | 7/1991 | Kadle | |
| 5,178,238 | A | 1/1993 | Schaeff | |
| 5,236,061 | A | 8/1993 | Haupt | |
| 5,250,081 | A | 10/1993 | Habeeb | |
| 5,253,985 | A | 10/1993 | Ruetz | |
| 5,291,969 | A | 3/1994 | Diederich | |
| 5,299,746 | A | 4/1994 | Thuenker | |
| 5,351,664 | A | 10/1994 | Rotter | |
| 5,363,823 | A | 11/1994 | Gittlein | |
| 5,366,400 | A | 11/1994 | Kucick | |
| 5,366,415 | A | 11/1994 | Church | |
| 5,431,588 | A | 7/1995 | Kucik | |
| 5,472,242 | A | 12/1995 | Petersen | |
| 5,477,817 | A | 12/1995 | Huffendiek | |
| 5,505,867 | A | 4/1996 | Ritter | |
| 5,507,206 | A | 4/1996 | Solski | |
| 5,533,274 | A | 7/1996 | Westling | |
| 5,547,349 | A | 8/1996 | Kimura | |
| 5,647,306 | A | 7/1997 | Pateman | |
| 5,676,840 | A | 10/1997 | Paul | |
| 5,711,270 | A | 1/1998 | Pederson | |
| 5,765,612 | A | 6/1998 | Morin | |
| 5,848,381 | A | 12/1998 | Ishii | |
| 5,851,386 | A | 12/1998 | Paul | |
| 5,896,834 | A | 4/1999 | Gruner | |
| 5,964,283 | A | 10/1999 | Pavlin | |
| 6,003,478 | A | 12/1999 | Huber | |
| 6,110,878 | A | 8/2000 | McConnachie | |
| 6,113,367 | A | 9/2000 | Dunaevsky | |
| 6,182,616 | B1 | 2/2001 | Itoh et al. | |
| 6,237,362 | B1 | 5/2001 | Jang | |
| 6,536,381 | B2 * | 3/2003 | Langervik | 123/41.33 |
| 6,634,323 | B2 * | 10/2003 | Vaudry et al. | 123/41.1 |
| 6,955,150 | B2 | 10/2005 | Moss | |
| 6,988,919 | B2 | 1/2006 | Tanaka | |
| 7,207,298 | B2 * | 4/2007 | Lee | 123/41.29 |
| 7,213,542 | B2 | 5/2007 | Oshima et al. | |
| 7,216,609 | B2 * | 5/2007 | Theorell | 123/41.29 |
| 7,261,080 | B2 | 8/2007 | Chonan | |
| 7,267,084 | B2 * | 9/2007 | Lutze et al. | 123/41.02 |
| 7,886,710 | B2 | 2/2011 | Tomaru | |
| 7,992,667 | B2 | 8/2011 | Rennie | |
| 8,186,328 | B2 | 5/2012 | Kiemlen | |
| 8,267,054 | B2 | 9/2012 | McMillan | |
| 8,402,929 | B2 | 3/2013 | Marsh | |
| 8,505,512 | B2 * | 8/2013 | Neal et al. | 123/196 AB |
| 2007/0137607 | A1 | 6/2007 | Ledbetter | |

OTHER PUBLICATIONS

Web Documents www.Mini-Madness.com.
Web Documents www.Liberatorperformanceinc.com.
Web Documents www.ford-trucks.com/forum.
Web Documents BAT, Inc.
Web Documents www.dieselplace.com.

* cited by examiner

METHOD OF MODIFYING ENGINE OIL COOLING SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

The present invention relates to a cooling system for an internal combustion engine and more particularly relates to an oil cooling system for both combustion ignition and diesel engines, collectively internal combustion (IC) engines.

BACKGROUND OF THE INVENTION

Most internal combustion engines require a cooling circuit having a coolant pump, radiator and passageways which circulate a coolant from the radiator through the engine block to cool the engine block and the moving components in the engine block. Lubricants, typically a synthetic or mineral-based oil, are utilized to lubricate the relatively moving surfaces in the engine to counteract friction, reduce wear and reduce operating temperatures.

However, excessive heat generated in the operation of the engine may cause the oil to degrade and break down losing its lubricating ability. When motor oils break down, they oxidize, thermally degrade and lose viscosity due to shear forces. As a result, many internal combustion engines, particularly high speed diesel engines and high performance combustion ignition engines, utilize engine block mounted oil coolers. Oil from the engine is passed through a cooler which operates as a heat exchanger with heat exchanger fluid, usually water and glycol, being provided from the engine cooling system from either the radiator or the engine block.

However, since the opening temperature of the thermostat in cooling systems of most internal combustion engines is approximately in the range of 180° to 200° Fahrenheit, an oil cooler utilizing engine coolant as the heat exchanger fluid is limited in its ability to cool the engine oil. By the operation of the cooling system thermostat in many engines, an oil temperature of approximately 200° to 220° F. is maintained so that the oil effectively lubricates and does not break down or degrade. Further, a low oil temperature is preferred because the oil, in addition to being a lubricant, also serves to cool the internal combustion engine components.

In a coolant to oil cooler system, the engine oil temperature is dependent upon the coolant supply. In the event of even a minor coolant loss, the engine may be damaged as the engine will incur the cooling loss provided both by the coolant and the engine oil.

Accordingly, there exists a need for an improved coolant to oil cooler system for IC engines which obviates the deficiencies set forth above.

BRIEF SUMMARY OF THE INVENTION

Briefly, the present invention provides a cooling system which replaces the conventional engine mounted coolant-to-oil heat exchanger with an external, high-capacity air-to-liquid heat exchanger. An adaptor block or manifold is configured to replace an existing Original Equipment Manufacturer (OEM) engine oil cooler and is mounted in place on the engine block utilizing the existing mounting and similar hardware and gaskets that secure the conventional engine oil cooler in place.

The manifold is configured or ported with a passageway to receive the hot, unfiltered oil from the engine and directs the oil to a canister-style oil filter of the type having a replaceable cartridge. The filter may be located immediately adjacent to the manifold or may be at a remote location within the engine compartment. Filtered oil from the oil filter is directed to an external heat exchanger, preferably a high-capacity air to liquid heat exchanger, which returns the cooled and filtered oil to the manifold which, in turn, returns cooled and filtered oil to the engine. The system may also include separate bypass filtration and a particle filtration screen within the manifold, as well as an oil bleeder valve and an anti-siphon valve. Suitable provision is made in the manifold for installation of sensors to measure engine operating parameters such as oil pressure and temperature. Further provision can be made for oil supply to an accessory such as a turbo charger.

BRIEF DESCRIPTION OF THE DRAWINGS

The above and other advantages and objects of the present invention will become more apparent when taken in conjunction with the following description, claims and drawings in which:

DETAILED DESCRIPTION

Figure 1:
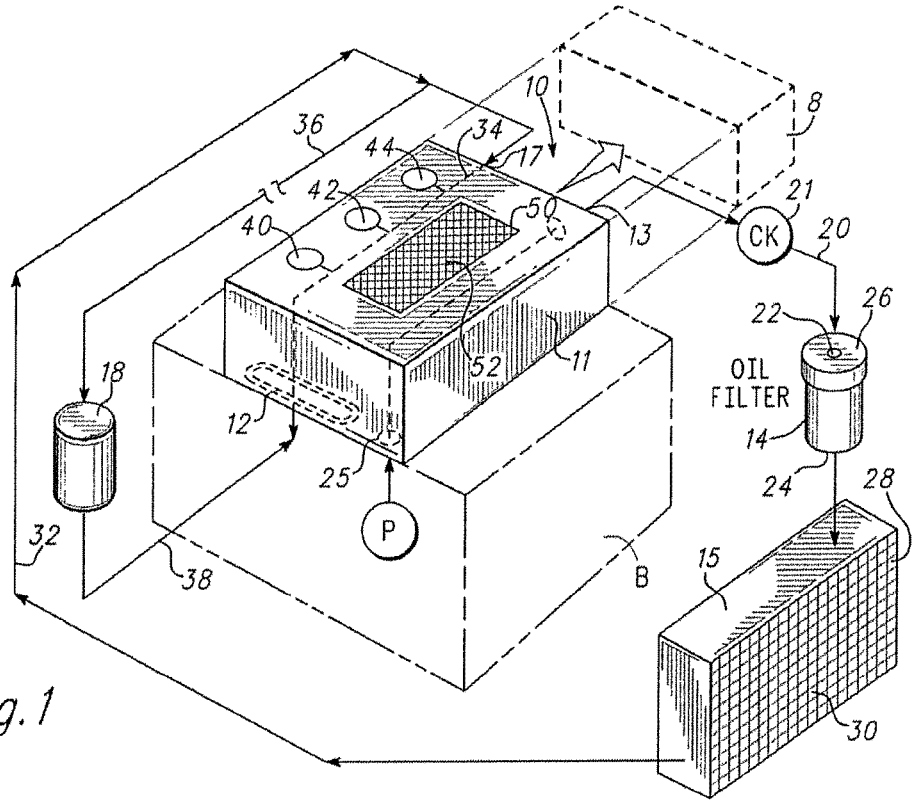
FIG. 1 is a schematic representation of an embodiment of a cooling system according to the present invention.
Figure 3:
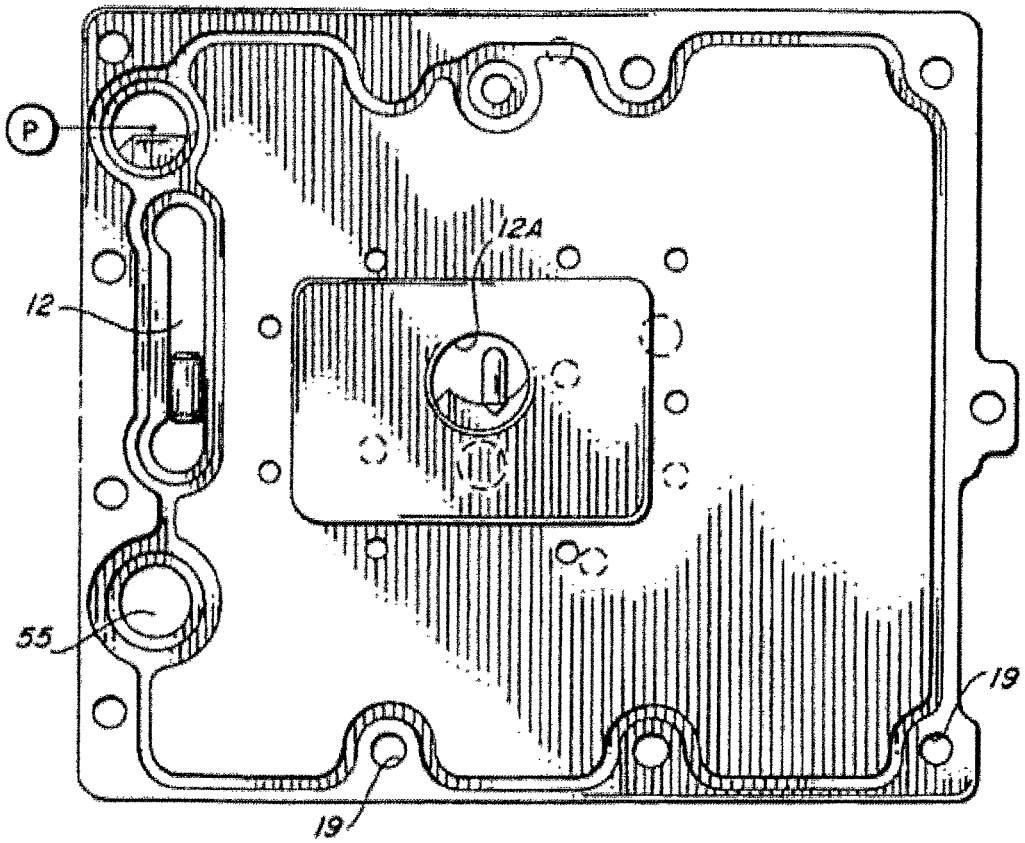
FIG. 3 is a plan view of the bottom of the manifold showing a representative 5 mounting configuration which is adapted to replace the conventional OEM oil cooler.

Turning now to the drawings, FIG. 1 shows the cooling system of the present invention mounted in place on the cylinder block B of an IC engine which is represented schematically by dotted lines. The mounting location may vary depending on the engine configuration. The IC engine may be a CI or diesel having an engine mounted cooler 8 which is removed and replaced with a manifold 11. The system indicated by the numeral 10 includes a housing or manifold 11 which may be cast and machined from a single block or billet of material such as steel or aluminum. Preferably the underside of the manifold, as best seen in FIG. 3, is machined to conform to the mounting configuration of the conventional coolant-to-oil cooler mounted on the engine block which cooler has been removed, having bolt holes 19 conforming to the existing bolt pattern. FIG. 3 shows a representative 5 mounting for a 6.0 L International® VT365 diesel engine also known as the 6.0 L Ford® Powerstroke diesel engine (hereinafter referred to as the "6.0

L VT365 diesel engine") found in a 2004 Ford F350 truck. If the engine has not been originally equipped with an oil cooler, suitable mounting provision for the manifold must be made which may involve appropriate modifications such as tapping the engine block at suitable locations for mounting the manifold and installing suitable hydraulic lines.

However, in most cases, the cooling system of the present invention will be applicable and is adapted for replacement of a conventional engine mounted IC coolant-to-oil cooler and the following description proceeds on that basis. Once the existing oil cooler is removed, the manifold 11 is secured using suitable hardware and gaskets to position and mount the housing on the engine block B. Port or passageway 25 in the underside of the manifold aligns with a port P in the engine block B through which hot, unfiltered oil is directed to the manifold 11. The oil enters the manifold at passageway 25 and flows through the manifold 11 exiting at port 13. Port 13 is connected by a hydraulic line 20 to oil filter 14. Line 20 has an anti-siphon check valve 21 to prevent reverse flow of oil through line 20. The oil filter 14 may be located immediately adjacent the manifold 11 or may be at a convenient location in the engine compartment considering engine size, available space and other installation restrictions.

The oil filter 14 is a canister-type and has an inlet 22 which communicates with and receives oil from the manifold. The housing has a lower screw or spin-on body 24 which is removable. The body 24 contains a suitable element 26 of a filtering material such as paper or fiber which is periodically replaceable. Preferably the filter is a conventional filter available from manufacturers such as FRAM, WIX and others. Particulates and contaminants are substantially removed as the oil passes through the filter element 26.

The oil exiting oil filter 14 is then directed to an external heat exchanger, preferably an air-to-liquid heat exchanger 15. The external heat exchanger may be a tube or plate design and is preferably of the tube type having a tube 28 carrying the oil to be cooled which extends in serpentine fashion within the heat exchanger housing. Because air is a relatively poor conductor of heat, the heat transfer area between the air passing over the tubes is increased by adding fins 30 to the tubes. The heat exchanger 15 is mounted in a location remote from the location of the OEM heat exchanger, preferably located in the vehicle to receive substantial airflow, for example at the front of the vehicle immediately adjacent and in front of the radiator for the engine cooling system. Ducting may be provided to increase airflow to the heat exchanger 15.

The oil which has been cooled and filtered is returned to an inlet port 17 on the manifold 11 via line 32. The inlet port 17 connects with internal passageway 34 communicating with outlet port 12. The outlet port 12 on the bottom of the manifold is aligned and communicates with the engine block port P so the cooled and filtered oil returns to the engine to provide lubrication. An additional outlet port 12A, as seen in FIG. 3, is provided to supply cooled and filtered oil to the high pressure oil pump.

Additional filtering may be provided by a bypass filter 18. The bypass filter 18 is a separate filter and may be of the canister type as described with reference to filter 14. A bypass line 36 removes a portion of the cooled and filtered oil prior to the oil entering into port 17 and directs the oil to the inlet of the bypass filter 18. The bypass filter 18 has an outlet which directs the flow via line 38 to port 12 to be returned to the engine. 5

Passageway 34 connected to port 17 may also be intercepted by passageways 40, 42 and 44 which are suitably threaded for connection to gauges such as the pressure gauge at 40, temperature gauge 42 and oil feed for the turbo at 44. Other sensing locations can also be provided to measure other operating parameters. Provision is made in the manifold to circulate coolant through the engine cooling system. Coolant enters the manifold at port 55 and exits at port 56 where it is returned to the engine cooling system without passing through an oil or water cooling heat exchanger. The coolant thus returned to the engine cooling system is circulated by a water pump through the existing passages in the engine block and radiator.

In many engines, metal particles will be released during operation. In addition to metal particles, sand used in the engine block casting process and retained in the engine may also be released. These larger, particulate materials can be harmful to the engine and may also quickly clog or reduce the effectiveness of the filters, such as the F1A filter, which are primarily intended to remove finer particulate materials.

The oil cooling system of the present invention may be provided with a particulate filter internal within the manifold 11 to trap and remove larger particulates which may otherwise quickly impair the effectiveness of element type filters. A cavity 50 is provided within the housing and removably receives a screen 52 having a mesh in the 0.003 to 0.005 inch range. The screen is accessible and removable by detaching the manifold from the engine block or access may be provided through a suitable access panel 54 on the manifold. A portion of the cooled and filtered oil entering the manifold at port 17 may be internally diverted to the cavity 50 and onto a surface of the particulate screen 52. The oil will, due to pressure existing in the system and gravity, flow downwardly through the screen to ports 12 and 12A returning to the engine. Particulate material will collect on the screen 52 and may be periodically removed by accessing the screen by removal of the manifold or through an access panel as described above.

Figure 4:
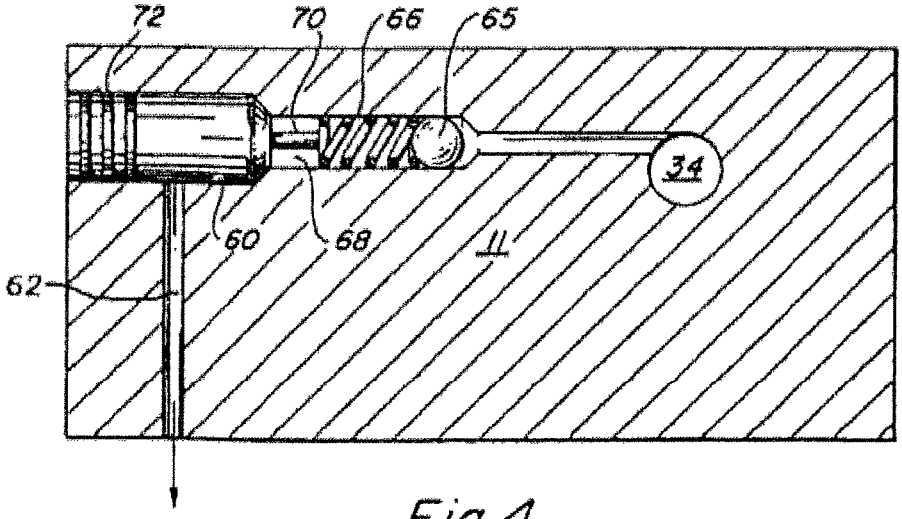
FIG. 4 is a cross-sectional view of a section of the manifold illustrating the air bleed valve.

An oil bleed valve 16 may be provided as seen in FIG. 4. The oil bleed valve 16 is in a passageway 60 communicating with passageway 34. A ball 65 is held in place by a spring 66. The spring 66 is retained by a plug 68 with a small orifice 70. Passageway 60 is closed by a plug 72. When the pressure in passageway 34 exceeds a predetermined level, the ball 65 will open returning oil to the engine crank case via line 62, allowing air within the engine's oil system to be removed.

Figure 2:
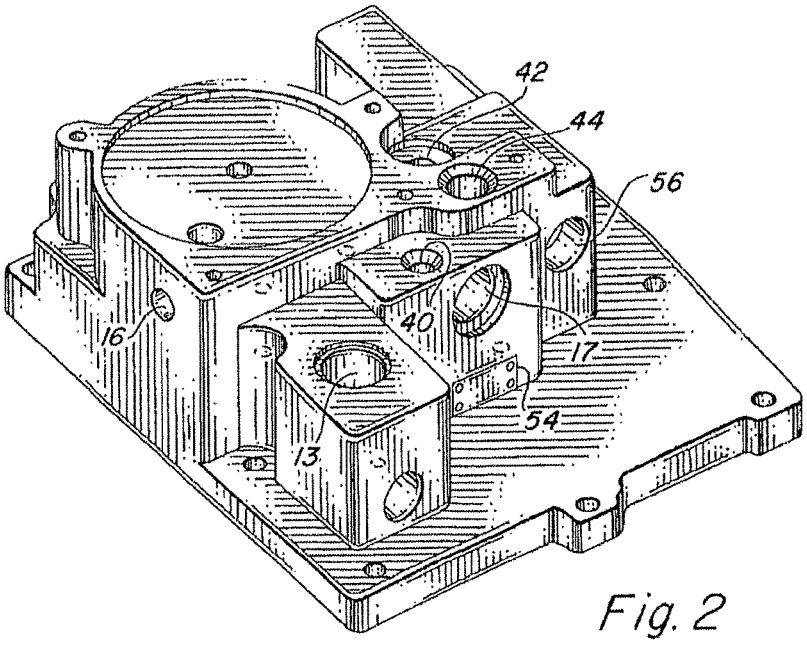
FIG. 2 is a detailed perspective view of the adaptor or manifold section of the cooling system shown in FIG. 1.

FIGS. 2 and 3 illustrate a representative configuration for the manifold and for the configuration of the passageways within the manifold which may be utilized in connection with the cooling system of the present invention. However, it will be appreciated that the particular configuration shape of the manifold may vary with the intended installation. It will also be appreciated that the present system has broad utility and application to various internal combustion engines of different types and displacement. Accordingly, while the present invention has been described in detail with reference to a preferred embodiment it is to be understood that the disclosure has only illustrated an exemplary embodiment.

Figure 5:
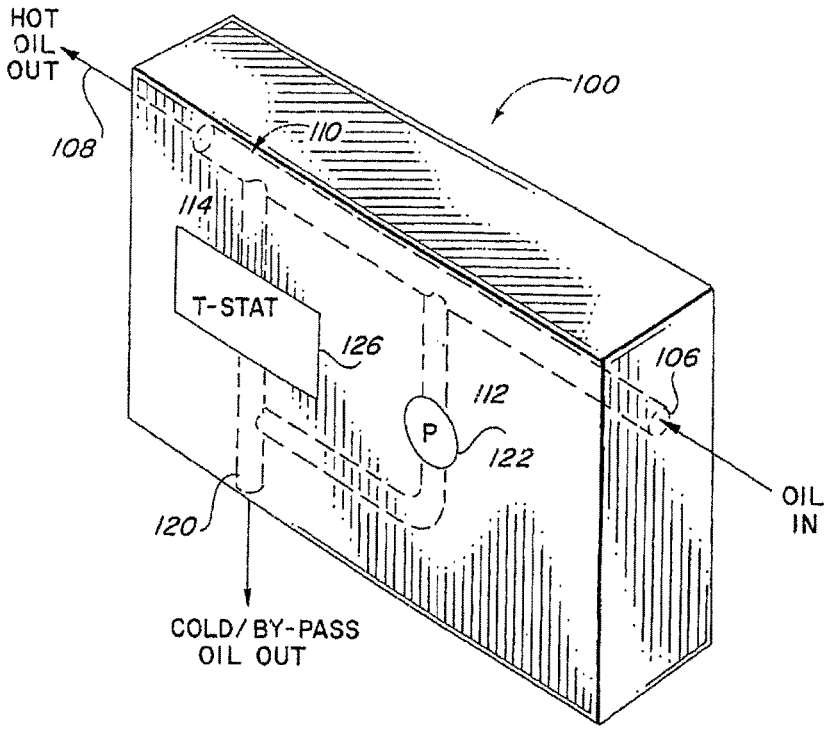
FIG. 5 is a schematic view of an engine oil by-pass that may be incorporated into the cooling system.
Figure 6:
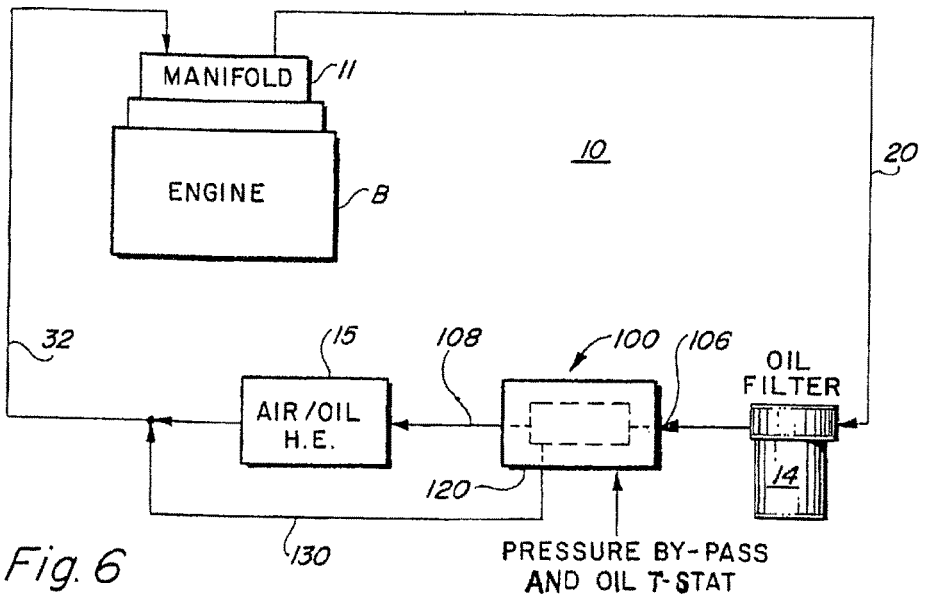
FIG. 6 is a schematic view showing the oil by-pass of FIG. 5 incorporated in the system of FIG. 1.

FIGS. 5 and 6 are schematics which show a by-pass 100 that may be incorporated into the system 10 shown in FIG. 1. Referring to FIG. 5, which 5 shows the by-pass 100 which has a housing 102 having an inlet 106 and outlet 108 connected by a passageway 110 is intercepted by a pressure by-pass line 112 and a temperature by-pass line 114 both of which communicate with by-pass outlet 120. A pressure control valve 122 such as a spring-biased valve is located in line 112. The valve 122 may be a direct acting relief valve which opens at a fixed pre-set pressure established by a spring which may be adjusted by a spring adjustment screw. The valve is set to by-pass fluid to the outlet when the differential pressure between the inlet and outlet of the oil cooler is above the setting, typically about 40-50 psi, which differential may initially occur during start-up before the pressure in the system generated by the engine oil pump has fully pressurized the engine oil system.

Similarly, the temperature by-pass line includes a thermostatic control 126 which has a selected opening temperature generally between 170-200° F. The thermostat control will block flow through the by-pass 100 and direct the oil flow to outlet 120 until such time as the temperature of the oil reaches a temperature at which the thermostat is set to open. Thus, the oil entering the by-pass 100 will be directed to the cold by-pass outlet 120 if either: (1) the engine oil is below a predetermined temperature by the closed thermostat 126 or (2) the oil pressure differential between the inlet and outlet of the oil cooling heat exchanger 15 is greater than the differential setting of the control valve 122.

In FIG. 6, the by-pass 100 is shown in the system 10 of FIG. 1. The system 10 has been simplified in FIG. 6 but is as described in greater detail with reference to FIG. 1 which description is incorporated here by reference. The by-pass 100 is located adjacent the air-to-liquid heat exchanger 15, either ahead of the heat exchanger 15 or downstream of the discharge. In FIG. 6, the by-pass 100 is shown ahead of the heat exchanger 15. The outlet 108 of the by-pass 100 is in communication with the heat exchanger 15. The by-pass outlet 120 is connected via by-pass line 130 to line 32 leading to the manifold 11. Accordingly, if engine oil is below a predetermined temperature or if a predetermined pressure differential exists between the inlet and outlet of oil exceeding the setting of control valve 122, oil will be by-passed through by-pass 100 allowing the system oil temperature and pressure to build to acceptable levels due to engine operation. This typically may take 4 or 5 seconds after start up. The by-pass 100 lessens stress and wear on engine components due to oil conditions which reduce the effectiveness of the lubrication.

Figure 7:
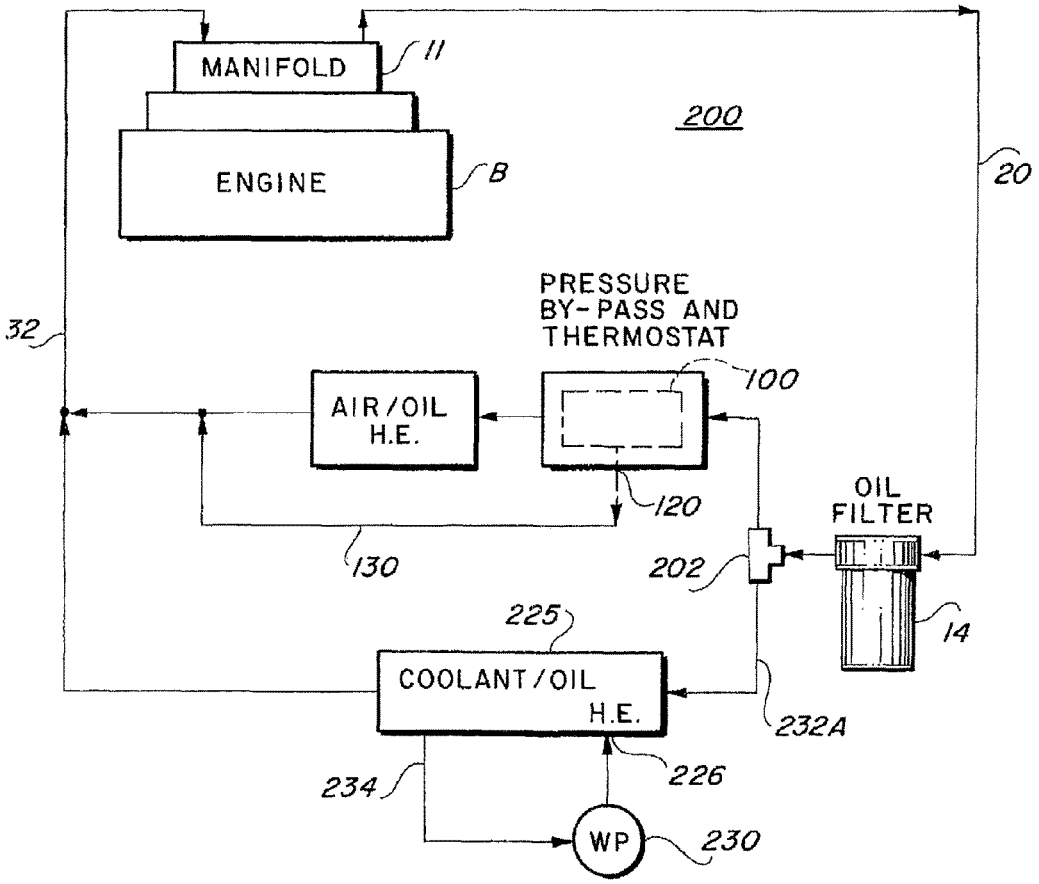
FIG. 7 is a schematic showing a modified system as shown in FIG. 6 further including both coolant-to-oil and air-to-oil heat exchangers with by-pass features to provide warming of the engine oil upon start-up.

In FIG. 7, a modification of the system 10 of claim 1 is shown which is adopted for engines which operate in colder climates. They system of FIG. 7 is indicated by the numeral 200 and includes a manifold 11 secured to the engine block B as described with reference to FIG. 1. The hot, unfiltered oil from the engine is directed to a filter 14 by line 20 and exits the filter 14 to tee 202 having outlet lines 232, 232A. Line 232 is directed to by-pass 100 located adjacent an air-to-liquid heat exchanger 15. The by-pass 100 is as described with reference to FIGS. 5 and 6. The heat exchanger 15 is as has been previously described with reference to FIG. 1. The by-pass 100 will direct engine oil either to the heat exchanger 15 or, if the temperature or pressure conditions of the oil are within predetermined by-pass parameters, the oil will be by-passed around the heat exchanger 15 via line 130 to line 32.

The engine oil discharged through line 232A is directed to a coolant-to-oil heat exchanger 225 which receives liquid coolant at inlet port 226 from the engine cooling system under pressure from the engine water pump 230 which is recirculated from the heat exchanger via line 234. The thermostat in the engine cooling system will operate at a preset opening temperature of typically around 190°-200° F. and be circulated by the water pump 230 through the heat exchanger 225 to warm the oil initially flowing through the heat exchanger from the filter. As the engine warms and the engine oil is heated, the heat exchanger 225 will operate to maintain the oil temperature at about the temperature of the engine coolant fluid from the water pump. Thus, the heat exchanger initially assists in heating the engine oil during the initial engine start-up and thereafter will operate to maintain the oil at an acceptable temperature.

The dual system of FIG. 7 having both an air heat exchanger and a liquid heat exchanger in parallel enhances or increases the effective heat exchange area and operates to cool engine oil during operation and will heat or warm the engine oil during initial start-up and has particular application to engines operating in colder climates or conditions.

It will be obvious to those skilled in the art to make various changes, alterations and modifications to the invention described herein. To the extent such changes, alterations and modifications do not depart from the spirit and scope of the appended claims, they are intended to be encompassed therein.

What is claimed is:

1. A method of modifying an oil cooling system for a vehicle having a diesel engine, the diesel engine having an engine block with an engine oil supply inlet, an engine water coolant outlet, an engine oil supply outlet located in a horizontal plane, an oil pump, and a water cooling system with a water pump, the engine having an original equipment liquid-to-liquid heat exchanger in which heat from the oil is transferred to the water cooling system, the original equipment liquid-to-liquid heat exchanger having a predetermined mounting configuration, the original equipment liquid-to-liquid heat exchanger further comprising an oil inlet, an oil outlet, a water inlet, and a water outlet each in a predetermined location, the method comprising:

(a) removing the original equipment liquid-to-liquid heat exchanger from the engine block;

(b) attaching a manifold to the engine, said manifold having an oil inlet port for receiving a flow of oil from the engine oil supply outlet, the manifold further comprising an oil outlet port, the manifold being sized and shaped to match the mounting configuration of the original equipment liquid-to-liquid heat exchanger, the manifold further being configured to position said oil inlet port at the location of the oil inlet of the original equipment liquid-to-liquid heat exchanger and being configured to position said oil outlet port at the location of the oil outlet of the original equipment liquid-to-liquid heat exchanger, whereby the manifold is capable of receiving the flow of oil from the engine oil pump without leakage;

(c) mounting a remote oil cooling heat exchanger in a location distal from the location of the original equipment liquid-to-liquid heat exchanger, the remote oil cooling heat exchanger receiving a flow of oil from said manifold and cooling the flow of oil prior to retuning the flow of oil to the engine oil supply, (d) the manifold further comprising a water passage providing an un-branched flow of water, the water passage having a water inlet port and a water outlet port, the manifold being configured to position the water inlet port adjacent the engine water coolant outlet of the engine at the location of the water inlet of the original equipment liquid-to-liquid heat exchanger, the manifold further being configured to position the manifold water outlet port so that the entirety of the flow of water in the bypass water passage is discharged back to the water cooling system of the engine without passing through the remote oil cooling heat exchanger.

2. The method of claim 1, wherein:

the vehicle has a front end and a rear end, and the method further comprises mounting the remote oil cooling heat exchanger proximal the front end of the vehicle.

3. The method of claim 2, wherein:

the vehicle comprises a radiator for cooling the engine coolant, and the method further comprises mounting the remote oil cooling heat exchanger proximal the vehicle radiator.

4. The method of claim 1, wherein said remote heat exchanger is an air-to-liquid heat exchanger.

5. The method of claim 4, wherein said air-to-liquid heat exchanger is a tube-and-fin heat exchanger.

6. The method of claim 1, wherein:

the manifold includes at least one sensor port.

7. The method of claim 1, wherein:

the manifold includes a horizontally disposed recess adapted to receive a particulate filter and the method further comprises mounting a particulate filter in the recess, the particulate filter having a filter screen with a mesh size of at least 0.003 inch receiving a portion of the flow of oil from said manifold.

8. The method of claim 7 wherein said filter screen is removable.

9. The method of claim 1, further comprising:

mounting an oil filter to receive a flow of oil from the outlet port of the manifold.

10. The method of claim 9, further comprising mounting the oil filter to discharge the flow of oil from the oil filter to the remote oil cooling heat exchanger.

* * * * *